United States Patent [19]

Hunsbedt

[11] Patent Number: 4,767,594
[45] Date of Patent: Aug. 30, 1988

[54] CONTROL OF REACTOR COOLANT FLOW PATH DURING REACTOR DECAY HEAT REMOVAL

[75] Inventor: Anstein N. Hunsbedt, Los Gatos, Calif.

[73] Assignee: General Electric Company, San Jose, Calif.

[21] Appl. No.: 51,332

[22] Filed: May 19, 1987

[51] Int. Cl.⁴ ............................................. G21C 15/18
[52] U.S. Cl. .................................... 376/299; 376/282; 376/290
[58] Field of Search ................. 376/282, 290, 298, 299

[56] References Cited

U.S. PATENT DOCUMENTS

| | | |
|---|---|---|
| 4,033,814 | 7/1977 | Bregeon et al. |
| 4,051,892 | 10/1977 | Reinsch |
| 4,138,318 | 2/1979 | Speelman |
| 4,181,570 | 1/1980 | Boyajian et al. |
| 4,280,796 | 7/1981 | Reinsch |
| 4,367,194 | 1/1983 | Schenewerk et al. |
| 4,440,719 | 4/1984 | Howard |
| 4,477,410 | 10/1984 | Debru |
| 4,668,467 | 5/1987 | Miler et al. |
| 4,678,626 | 7/1987 | Germer |
| 4,687,626 | 8/1987 | Tong |
| 4,699,754 | 10/1987 | French |

*Primary Examiner*—Deborah L. Kyle
*Assistant Examiner*—Richard W. Wendtland
*Attorney, Agent, or Firm*—Robert R. Schroeder

[57] ABSTRACT

An improved reactor vessel auxiliary cooling system for a sodium cooled nuclear reactor is disclosed. The sodium cooled nuclear reactor is of the type having a reactor vessel liner separating the reactor hot pool on the upstream side of an intermediate heat exchanger and the reactor cold pool on the downstream side of the intermediate heat exchanger. The improvement includes a flow path across the reactor vessel liner flow gap which dissipates core heat across the reactor vessel and containment vessel responsive to a casualty including the loss of normal heat removal paths and associated shutdown of the main coolant liquid sodium pumps. In normal operation, the reactor vessel cold pool is inlet to the suction side of coolant liquid sodium pumps, these pumps being of the electromagnetic variety. The pumps discharge through the core into the reactor hot pool and then through an intermediate heat exchanger where the heat generated in the reactor core is discharged. Upon outlet from the heat exchanger, the sodium is returned to the reactor cold pool. The improvement includes placing a jet pump across the reactor vessel liner flow gap, pumping a small flow of liquid sodium from the lower pressure cold pool into the hot pool. The jet pump has a small high pressure driving stream diverted from the high pressure side of the reactor pumps. During normal operation, the jet pumps supplement the normal reactor pressure differential from the lower pressure cold pool to the hot pool. Upon the occurrence of a casualty involving loss of coolant pump pressure, and immediate cooling circuit is established by the back flow of sodium through the jet pumps from the reactor vessel hot pool to the reactor vessel cold pool. The cooling circuit includes flow into the reactor vessel liner flow gap immediate the reactor vessel wall and containment vessel where optimum and immediate discharge of residual reactor heat occurs.

7 Claims, 4 Drawing Sheets

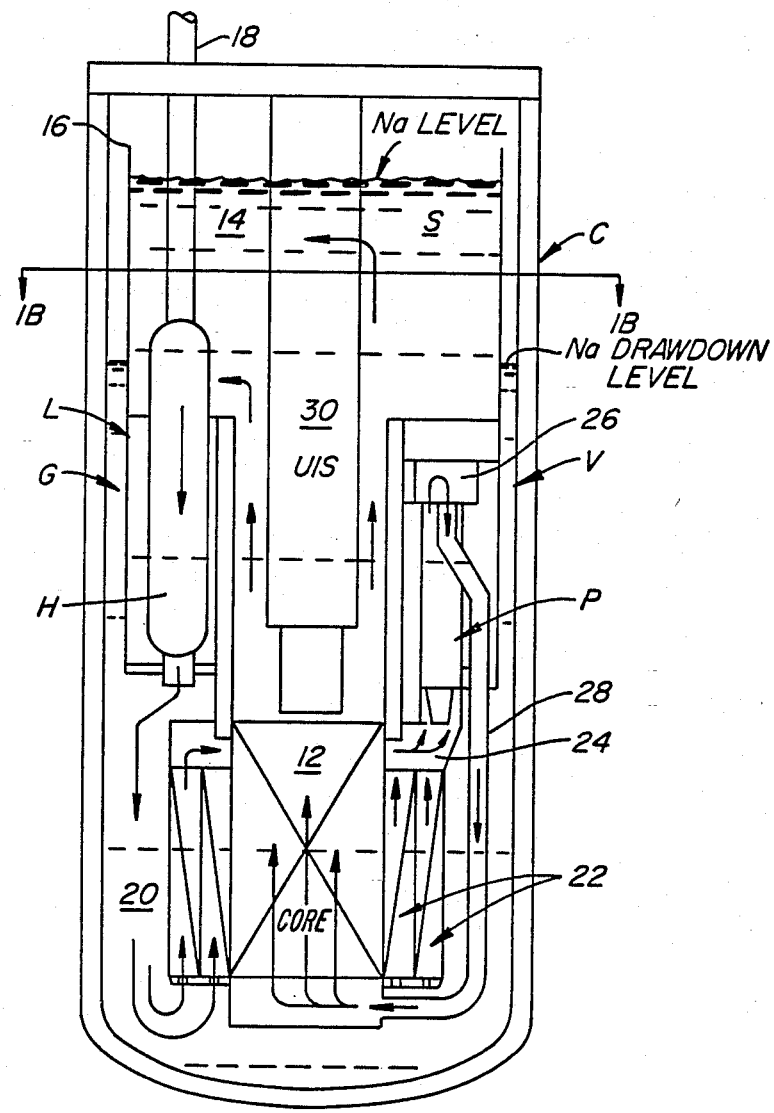
FIG._1A.   (PRIOR ART)

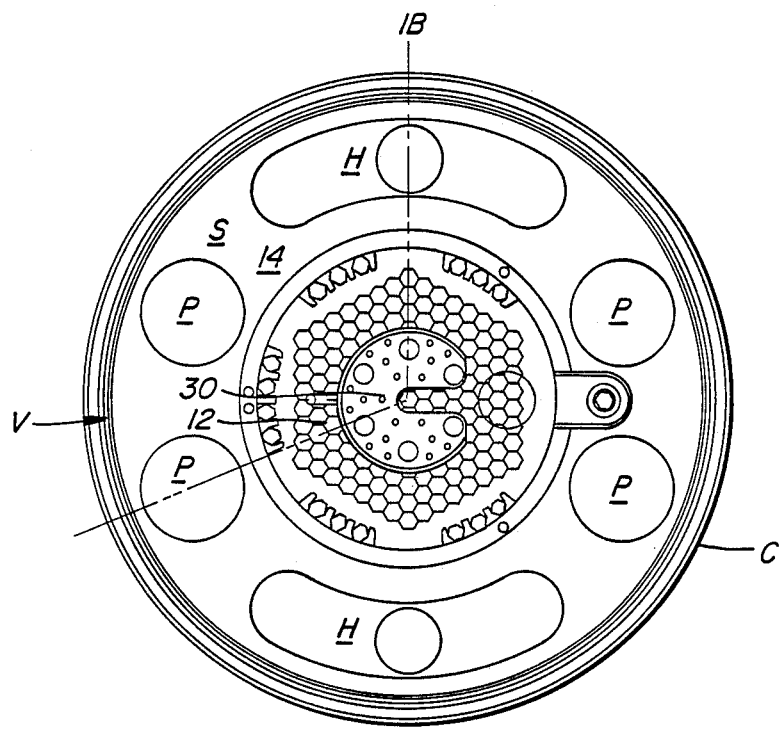
FIG._1B.   (PRIOR ART)

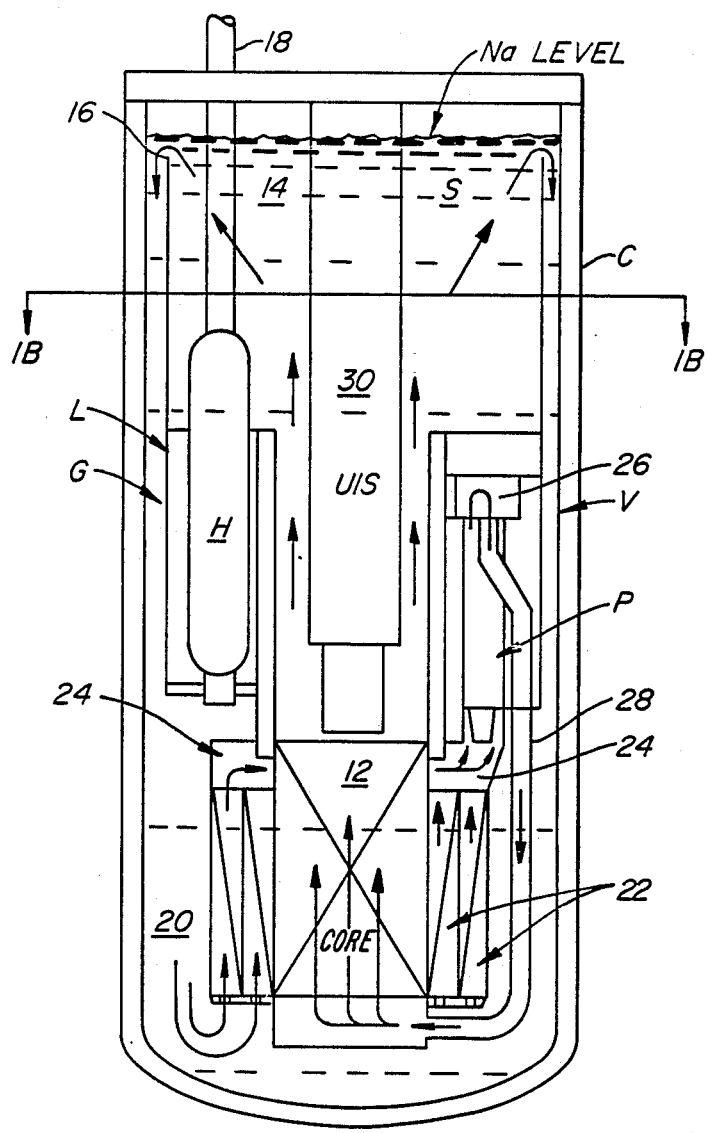
FIG._1C. (PRIOR ART)

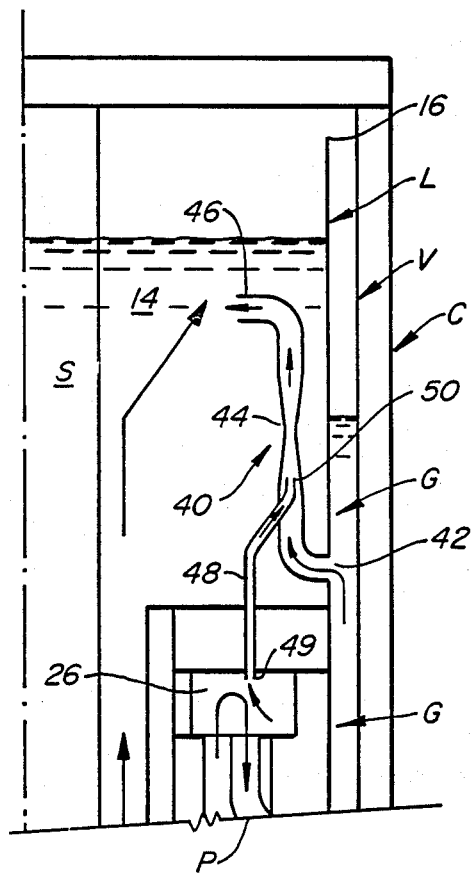 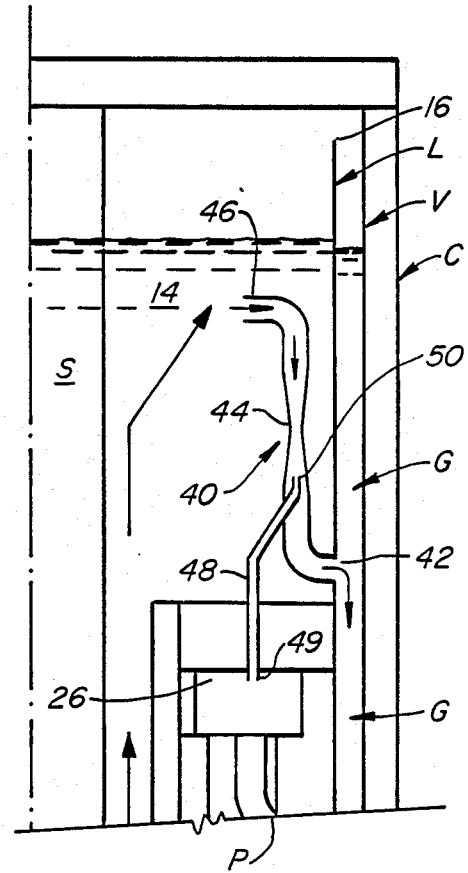
FIG._2A.  FIG._2B.

CONTROL OF REACTOR COOLANT FLOW PATH DURING REACTOR DECAY HEAT REMOVAL

Reference to government related application United States has rights in this invention under Contract No. DE-AC06-85NE37937 in 24-BR-04901.

BACKGROUND OF THE INVENTION

This invention relates to sodium cooled reactors. More particularly, this invention relates to an improved reactor vessel auxiliary cooling system sodium flow circuit to supplement heat discharge through the reactor vessel to passing air for residual heat removal from a sodium reactor shutdown under emergency conditions.

OUTLINE OF THE DISCLOSURE

In certain sodium cooled reactors, the reactor vessel and containment vessel have immediate their exterior an air cooling system. This air cooling system provides for the dissipation of residual heat upon emergency shutdown of the reactor. Since such air cooling systems are well known in the prior art, they will not be discussed further here. This invention is directed rather to the dissipation of heat through the reactor vessel and containment vessel walls where it may reach the air cooling system.

In certain sodium cooled reactors, the sodium hot pool is separated from the sodium cold pool by a reactor vessel liner. The purpose of the reactor vessel liner is to separate the reactor hot pool from the reactor cold pool and force fluid flow through the intermediate heat exchanger (IHX) located within the reactor vessel. The reactor vessel liner has a vital secondary function. That function is to short circuit the flow through the IHX to the reactor vessel liner flow gap immediate the reactor vessel wall. Such a short circuiting is required for residual heat dissipation upon loss of normal heat removal systems. The residual heat escapes through the reactor vessel and containment vessel.

In such a casualty, it is assumed that reactor control rods are fully inserted. With such full insertion, there nevertheless remains residual heat that must be dissipated. It is the dissipation of this residual heat and the activation of the coolant flow path (here liquid sodium) which is the subject of this invention.

In the understanding of this invention, extensive attention will be directed to the prior art normal operation flow path and the prior art residual heat discharge flow path. Emphasis will be placed upon the shortcomings of the prior art residual heat discharge flow path. Thereafter, and once these shortcomings are understood, the improvement constituting the addition of jet pumps from the cold pool to discharge at the slightly higher pressure hot pool will be set forth. It will be emphasized that an improved safety circuit is disclosed.

BRIEF DESCRIPTION OF THE DRAWINGS

FIG. 1A is a side elevation section of a prior art sodium cooled reactor illustrating the flow circuit during normal reactor operation;

FIG. 1B is a plan view of the reactor of FIG. 1A taken along lines 1B—1B of both FIG. 1A and FIG. 1C;

FIG. 1C is an illustration of the prior art sodium coolant flow path during a reactor vessel auxiliary cooling system operation showing the sodium flow path for the dissipation of heat to an air stream passing exterior of the containment vessel;

FIG. 2A illustrates the improvement including the jet pump installed across the reactor vessel liner flow gap establishing a coolant hydrostatic head between the liquid sodium cold pool and the slightly higher pressure liquid sodium hot pool; and FIG. 2B illustrates the improved cooling fluid circuit for reactor vessel auxiliary cooling upon a loss of coolant pump pressure.

SUMMARY OF THE PRIOR ART

Referring to FIG. 1A, a liquid sodium reactor is shown enclosed within a containment vessel C and a reactor vessel V. As is common in the art, containment vessel C is closely spaced to reactor vessel V and is capable of containing liquid sodium S in case of a rupture of the reactor vessel V.

The components of the reactor can best be understood by tracing the sodium coolant flow path and at the same time describing the component parts.

Continuing with FIG. 1A and remembering that the reactor is undergoing normal power operation, core 12 heats passing sodium S and discharges the sodium S into a hot pool 14. Hot pool 14 is confined interior of the reactor by a vessel liner L. It is important to note that vessel liner L only extends partially the full height of the reactor vessel V terminating short of the top of the reactor vessel V at 16.

Sodium from hot pool 14 enters into intermediate heat exchanger H and dissipates heat. Heat is dissipated through a secondary sodium circuit schematically labeled 18 which passes typically to a steam generating heat exchanger and then to conventional power generation (both these elements not being shown).

After heat exchange and flow induced pressure drop across heat exchanger H, the liquid sodium passes to cold pool 20. Cold pool 20 is at a lower hydrostatic pressure than hot pool 14 because of the pressure drop through the heat exchanger H. Cold pool 20 outflows through fixed shield cylinders 22 to the inlet 24 of main reactor pumps P. Typically main reactor pumps P are of the electromagnetic variety and have low pressure inlet 24 and high pressure outlet 26. Sodium outlet through high pressure outlet 26 passes through pump discharge pipe 28 to the inlet of core 12. This completes the sodium circuit.

The reactor cold pool 20 is maintained at a slightly lower pressure (about 4 psi) from the reactor hot pool during normal operation.

The necessary reactor control rods enter and are withdrawn to and from a control rod plenum 30. Since the control rods do not constitute a part of this invention, they will not further be discussed.

The reader will realize that FIG. 1A and its description is an oversimplification of the sodium cooled reactor. In actual practice, the reactor includes two kidney sectioned heat exchangers H and four pumps P. Disposition of the pumps P and heat exchangers H can be understood with respect to FIG. 1B.

It will further be understood that the section of FIG. 1A is for purposes of understanding. Observing 1A—1A. Not section lines shown on FIG. 1B. I have indicated where they might be section lines 1A—1A on FIG. 1B, it will be seen that the section is not conventional.

Referring to FIG. 1C, the prior art reactor vessel auxiliary cooling system sodium flow loop can be understood.

First, and upon occurrence of a casualty involving loss of all normal heat removed paths via the IHX H and the secondary sodium circuit 18 it is assumed that all electrical pump power is lost. Since all electrical power is lost, pumps P will become inoperative.

When loss of pump coolant pressure has occurred, control rods from plenum 30 will be fully inserted within core 12. Initially, and for a period of several hours, residual heat within core 12 will cause a primary sodium flow circuit identical to that illustrated in FIG. 1A. However, the natural circulation primary sodium flow rate, with the loss of pressure of pumps P will be 2% or 3% of the normal flow rate.

In about two or three hours, a reactor will undergo a thermal transient. It will heat from a normal hot pool temperature of around 875° F. to approximately 1000° F. in both the hot pool and the cold pool. This heating occurs because even with the control rods fully inserted as residual heat from the atomic reaction needs to be dissipated from core 12.

The fluid circuit of FIG. 1A without the pumps operational is marginal for the required dissipation of the reactor residual heat in the long term. As the sodium temperature increases, the sodium expands. It expands from the relatively low level illustrated in FIG. 1A to the relatively high level illustrated in FIG. 1C. In fact, the sodium level expands upwardly and over top wall 16 of reactor vessel liner L. It is at this point that a new (but prior art) flow circuit providing the necessary dissipation of heat is provided.

Referring to FIG. 1C, flow occurs from reactor cold pool 20 through pump inlet manifold 24 through pump P to outlet manifold 26 and pump discharge pipe 28. The sodium passes through core 12 into hot pool 14. At hot pool 14, some sodium will flow through intermediate heat exchanger H. The large measure of sodium flow will occur over the top of vessel liner L at 16 and into the vessel liner flow gap G.

Remembering that vessel flow liner gap G extends entirely around the periphery of the reactor vessel V, it can be seen that hot sodium is provided with an improved heat discharge path. As the exterior of the containment vessel C is continually cooled with passing air, it will be understood that the prior art flow circuit of FIG. 1C provides the necessary improved dissipation of residual heat from the shutdown reactor.

In the nuclear industry, there remains a constant search for improved safety margins. It is necessary in the understanding of my invention to review the safety considerations of the prior art reactor circuit just set forth.

It will be realized that the flow circuit illustrated in FIG. 1C is volume dependent on the amount of sodium contained within the reactor vessel V. If the volume is less than that illustrated in FIG. 1A, the reactor will be required to undergo a greater heatup transient to provide for the necessary expansion of the sodium S to achieve the required liner overflow.

The interior of the reactor vessel V is an extremely hostile environment. Sodium level gauges have been and are now always suspect in their operation. In an volume dependent sodium system, the malfunction of a level gauge could well lead to the reactor undergoing higher temperature transients than those transients originally intended to cause the flow circuit of FIG. 1C.

Further, and assuming that there is a rupture in the vessel V to the containment vessel C, the level of the sodium would drop and the flow circuit of FIG. 1C would not be established without a greater temperature transient, if establishment occurred at all. Simply stated, the flow circuit of FIG. 1C has demonstrable disadvantages known to those skilled in the art.

DESCRIPTION OF THE PREFERRED EMBODIMENT

Referring to FIG. 2A, the improvement of my invention is illustrated. Simply stated, I installed across reactor vessel liner L, a jet pump 40. Jet pump 40 has an inlet 42 at the reactor vessel liner flow gap G, a venturi 44 and an outlet 46. Outlet 46 is typically within, parallel to, and well below the surface of the sodium pool to provide surging of the liquid sodium at the top of the pool during normal reactor operation.

Jet pump 40 is powered during normal reactor operation through a high pressure sodium line 48. Sodium line 48 has an inlet 49 at the high pressure plenum 26 of pump P and a high velocity outlet 50 into the venturi 44. With a flow of pumping fluid from the high pressure plenum 26 into the venturi 44, jet pump 40 will entrain a flow of fluid. This flow of fluid will be from the cold pool through the reactor vessel liner flow gap G into the hot pool 14. As illustrated in FIG. 2A, together with the flow across the intermediate heat exchanger H, the jet pump 40 of FIG. 2A will assist in establishing the required pressure differential between the cold pool in reactor vessel liner flow gap G and the hot pool 14.

It will be understood that in FIG. 2A, I only illustrate one jet pump 40. In actual practice I currently contemplate eight such jet pumps 40 with two such pumps being communicated to each pump P. It will be understood that the number of pumps 40 and their placement will constitute an optimization process which will be dependent upon the flow thermodynamics of any particular sodium reactor.

Referring to FIG. 2B, the operation of my pump 40 upon loss of high pressure within pump P high pressure plenum 26 can be readily understood. As indicated earlier loss of high pressure within pump P would occur following loss of the normal heat removal paths and rapid activation of the overflow path is required.

First, jet pump 40 will no longer function. Second, liquid sodium from reactor hot pool 14 will immediately backflow through jet pump outlet 46 into the reactor vessel liner flow gap G at jet pump inlet 42 In short, jet pump 40 will operate as a nonmechanical check valve allowing the immediate establishment of a flow circuit from the reactor vessel hot pool 14 into the reactor vessel liner flow gap G.

ADVANTAGES

The reader will understand that by the establishment of an immediate flow circuit from the reactor hot pool to the reactor vessel liner flow gap G that an a headup transient of the reactor for the required sodium expansion is no longer necessary. Instead, and upon pump P shutdown, the supplementary cooling circuit is immediately established. Thus, my invention constitutes an improved reactor design. This improved design includes not having to depend on the heatup transient necessary for activating the cooling circuit of the prior art illustrated in FIG. 1C.

Additionally, my cooling circuit is no longer as volume dependent upon the level of liquid sodium S required in a reactor. So long as the sodium level is above the outlet 46 of jet pump 40, my system is functional.

The advantage of this can be understood especially where rupture of the reactor vessel occurs and overflow to the containment vessel is present. Where such overflow occurs, there will be a drop in the level of sodium S. This drop in the level of sodium S will not affect the operation of my cooling circuit nor its immediate establishment.

Further, the cooling circuit of my invention is less dependent upon the accuracy of sodium level gauges in the internal of reactor vessel V.

There is a price for the safety feature of my system. It will be understood that I dilute reactor hot pool 14 by small direct flow from the reactor vessel cold pool through the vessel liner flow gap G. Additionally, I use energy of pump P for my jet pumps 40. Accordingly, the pumps and heat exchangers must be expanded in size to accommodate an approximate 15% increase in overall system flow rate. Further, the hot pool temperature will decline. However, the overall output of the reactor will remain substantially unchanged.

By way of example, in a 400 megawatt reactor approximately 4 megawatts will be utilized in pumping. According to the prior art embodiment of FIG. 1C, the safety circuit of my invention will require 4.6 megawatts for the required pumping.

It is submitted that these required changes in heat exchanger and pump capacity are more than compensated by the improved safety set forth.

What is claimed is:

1. In a sodium cooled reactor of the type having a reactor hot pool, a slightly lower pressure reactor cold pool and a reactor vessel liner defining a reactor vessel liner flow gap separating said hot pool and said cold pool along the reactor vessel sidewalls and wherein the normal sodium circuit in the reactor includes main sodium reactor coolant pumps having a suction on said lower pressure sodium cold pool and an outlet to a reactor core; said reactor core for heating the sodium and discharging the sodium to said reactor hot pool; a heat exchanger for receiving sodium from said hot pool, and removing heat from the sodium and discharging the sodium to said lower pressure cold pool; the improvement across said reactor vessel liner comprising: a jet pump having a venturi installed across said reactor vessel liner, said jet pump having a lower inlet from said reactor vessel cold pool across said reactor vessel liner and an upper outlet to said reactor vessel hot pool;

a pumping fluid inlet from the high pressure discharge of said main sodium reactor coolant pumps, said inlet having a high velocity outflow to said jet pump venturi whereby upon normal operation of said main sodium reactor coolant pumps, the jet pump maintains a pressure differential from said lower pressure cold pool to said hot pool and upon failure of said main sodium reactor coolant pump, the jet pump permits immediate sodium backflow from the hot pool to the lower pressure cold pool across the reactor vessel liner flow gap to establish immediate cooling of residual reactor heat through the reactor vessel wall.

2. The invention of claim 1 and wherein said jet pump outlet is parallel to and well below the surface of liquid sodium in said reactor.

3. The invention of claim 1 and wherein said sodium cooled reactor includes a plurality of said jet pumps.

4. The invention of claim 3 and wherein said sodium cooled reactor has a plurality of main sodium reactor coolant pumps and each of said pumps has a plurality of said jet pumps.

5. A sodium cooled reactor comprising in combination: a reactor hot pool; a lower pressure reactor cold pool; a reactor vessel liner separating said hot pool and said cold pool interior of a reactor vessel and immediate said reactor vessel side walls; a main sodium reactor coolant pump having a suction on said low pressure cold pool and an outlet;

a reactor core for heating sodium discharged from said pumps, said reactor core having an inlet communicated to the outlet of said pump and an outlet to said reactor hot pools; a heat exchanger for receiving sodium from said hot pool, removing heat from the sodium and discharging the sodium to said cold pool; a jet pump having a venturi installed across said reactor vessel liner, said jet pump having a lower inlet from said reactor vessel cold pool and an upper outlet to said reactor vessel hot pool; a pumping jet having an inlet from the high pressure discharge of said main sodium reactor coolant pump and having an outflow to the jet pump venturi whereby upon operation of said main sodium reactor coolant pumps, the jet pump maintains a pressure differential from said lower pressure cold pool to said hot pool, and upon loss of normal heat removal paths and associated shutdown of said main sodium reactor coolant pumps, the jet pump permits immediate backflow from the hot pool to the lower pressure cold pool across the reactor vessel flow gap to establish an immediate sodium cooling flow path for residual reactor heat removal through the reactor vessel.

6. The invention of claim 5 and wherein said jet pump discharge to said reactor vessel hot pools is parallel to the surface of said reactor vessel hot pool.

7. The invention of claim 5 and including a plurality of jet pumps connected to said sodium cooled reactor.

* * * * *